2,810,719
Patented Oct. 22, 1957

2,810,719

MORPHOLINO ALKYL ETHERS OF HYDROXYBENZOIC ACID ESTERS

Marjorie B. Moore and Maynette R. Vernsten, Waukegan, Ill., assignors to Abbott Laboratories, North Chicago, Ill., a corporation of Illinois No Drawing. Application October 19, 1954, Serial No. 463,316

11 Claims. (Cl. 260—247.2)

This invention relates to heterocyclicaminoalkyl ethers of hydroxybenzoic acid esters and to methods for making said compounds.

The compounds to which this invention relate are bases having the chemical structure

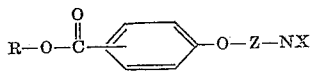

wherein R is a straight or branched chain saturated aliphatic alkyl group having from 1 to 10 carbon atoms inclusive, Z is an alkylene group having from 2 to 6 carbon atoms inclusive and NX is a monocyclic heterocyclic amine group. Acid addition salts of these basic compounds are readily formed and are contemplated as a part of this invention. For example, these basic compounds may be converted to the hydrochloride, the sulfate and organic acid salts such as the oxalate and the tartrate. Generally speaking, the basic ethers of this invention are higher boiling liquids while the acid addition salts are water-soluble solids.

As shown in the structural formula the carboxylate radical can be attached to the phenylene ring at either the ortho, meta or para position and numerous examples of each of these series are given hereinafter. The alkyl group designated by the symbol R in the foregoing structural formula may be any alkyl group having from 1 to 10 carbon atoms inclusive and may include the methyl, ethyl, propyl, isopropyl, butyl, isobutyl, n-amyl, isoamyl, hexyl, n-heptyl, n-octyl, n-nonyl, and n-decyl groups.

The alkylene group designated by the symbol Z in the foregoing structural formula is any one having from 2 to 6 carbon atoms inclusive. Examples are included herein in which the alkylene group contains 2, 3, 5 and 6 carbons and it will be apparent that alkylene groups containing 4 carbons may be prepared without difficulty by the same procedures.

The monocyclic heterocyclic amine group represented in the structural formula by the symbol —NX is intended to include the morpholino, piperidino, N-methyl piperazino, pyrrolidino, piperazino groups, and their alkyl substituted derivatives.

The heterocyclicaminoalkyl ethers of hydroxybenzoic acid esters of this invention are valuable new compounds exhibiting useful therapeutic activities. The lower members of the series in which the terminal alkyl group contains up to about 4 to 5 carbon atoms are effective local anesthetics of low toxicity and the members of the series in which the terminal alkyl group contains more than about 4 carbon atoms exhibit activity against fungi in high dilution.

The compounds of this invention may be prepared by several different methods. One of the preferred methods of making these compounds involves the preparation of an inert solvent solution of an alkali metal salt of an appropriate hydroxybenzoate, such as the sodium salt of methyl salicylate in anhydrous methanol. This salt is heated with an equimolar amount of a heterocyclicamino- alkyl halide such as γ-morpholinopropyl chloride. The reaction product is purified and recovered by conventional procedures. Acid addition salts of the reaction product are readily formed.

Another synthesis of compounds of this invention involves the reaction between a monocyclic heterocyclic amine and a carboalkoxyphenyl haloalkyl ether. The carboalkoxyphenyl haloalkyl ethers are novel compounds prepared by the reaction of an alkylenehalide with a suitable hydroxybenzoate such as methyl or ethyl salicylate in the presence of an alkali metal alcoholate.

Still another synthesis involves the esterification of a carboxyphenyl heterocyclicaminoalkyl ether with a straight or branched chain saturated aliphatic alcohol having from 1 to 10 carbon atoms inclusive. The preferred method of synthesis will depend upon the availability of suitable intermediates and other economic considerations.

The following examples are presented in order to disclose the invention in greater detail. It should be understood, however, that the examples are not intended in any way to be a limitation on the scope of the invention.

EXAMPLE I

*o-Carbomethoxyphenyl γ-morpholinopropyl ether*

Sodium (2.3 g., 0.1 mole) is dissolved in about 50 ml. anhydrous methanol, and methyl salicylate (15.2 g., 0.1 mole) is added with stirring. To the continually stirred mixture is then added γ-morpholinopropyl chloride (16.4 g., 0.1 mole) and the whole stirred and refluxed for about four hours. Most of the alcohol is removed under reduced pressure, and the residue is partitioned between ethyl ether and an aqueous solution containing about 0.1 mole sodium hydroxide. The ether layer is dried by sodium sulfate, the ether evaporated and the residue distilled. The o-carbomethoxyphenyl γ-morpholinopropyl ether boils at 188–190° C. at 2.5 mm. Analysis calculated for $C_{15}H_{21}NO_4$: N, 5.014. Fd.: N, 5.06. The hydrochloride prepared from this base melts at 160–161° C. Analysis calculated for $C_{15}H_{21}NO_4 \cdot HCl$: N, 4.44. Fd.: N, 4.48.

This compound and others of the series are also prepared by the reaction of o-carbomethoxyphenyl γ-halopropyl ether with morpholine or by esterification of o-carboxyphenyl γ-morpholinopropyl ether with a straight or branched chain saturated aliphatic alcohol having from 1 to 10 carbons inclusive.

EXAMPLE II

*o-Carbo-n-nonyloxyphenyl γ-morpholinopropyl ether* n-Nonyl salicylate is prepared by the reaction of about 2 ml. concentrated sulfuric acid, 183 g. (1.27 mole) n-nonyl alcohol and 41.5 g. (0.3 mole) salicylic acid. The resulting mixture is stirred and heated in a flask equipped with a take-off condenser to remove water as formed. After three hours the reaction mixture is cooled, taken up in ether, and the solution washed successively with water, sodium bicarbonate solution and water. The dried ethereal solution is distilled, the n-nonyl salicylate boiling at 141–144° C./0.7 mm. It is slightly contaminated with di-n-nonyl ether but sufficiently pure to use in the formation of the γ-morpholinopropyl ether.

About 3.9 g. (0.1 mole) potassium is added to 250 ml. n-nonyl alcohol and the mixture stirred and heated until the potassium has reacted. To this solution is added 26.4 g. (0.1 mole) n-nonyl salicylate followed by 26.4 g. (0.1 mole) γ-morpholinopropyl chloride. The mixture is stirred and heated to 205° C. for 18 hours. After cooling to about 100° C. most of the alcohol is removed at reduced pressure. The residue is staken up in dilute hydrochloric acid and extracted with ether to remove any di-n-nonyl ether or unreacted phenol. The aqueous solution is made alkaline and extracted with ether. The ethereal extract is dried, filtered and distilled, and the product o-carbo-n-nonyloxyphenyl γ-morpholinopropyl ether has a boiling point of 195–196° C./0.15 mm. Calculated for $C_{23}H_{37}NO_4$: 70.55% C; 9.53% H. Found: 71.07% C.; 9.43% H.

EXAMPLE III p-Carbo-n-octyloxyphenyl γ-morpholinopropyl ether

Potassium (6.7 g., 0.17 mole) is reacted with n-octanol (55 ml.) by gentle refluxing and stirring. After most of the metal has been converted to the nearly insoluble alcoholate, n-octyl p-hydroxybenzoate (43 g., 0.17 mole) in 25 ml. n-octanol is added to the stirred product; then γ-morpholinopropyl chloride (27.8 g., 0.17 mole) is similarly added. The whole is stirred and refluxed for about 4 hours, when the product becomes practically neutral according to a test with indicator paper. Partition between water and ether gives an ethereal layer containing most of the n-octanol as well as the desired ester ether. Evaporation does not remove the n-octanol and the basic material is extracted with aqueous 10% hydrochloric acid; the solution is washed with ether to remove the n-octanol. The aqueous solution of the hydrochloride is evaporated, benzene being added to aid in the removal of water. The soapy solid is recrystallized from dioxane. The material insoluble in dioxane is found to be p-carboxyphenyl γ-morpholinopropyl ether hydrochloride probably formed by hydrolysis of the ester during evaporation. The desired ester dissolves in the hot solvent and precipitates upon cooling. A second such recrystallization gives the hydrochloride of p-carbo-n-octyloxyphenyl γ-morpholinopropyl ether, M. P. 127–129° C. after drying in vacuo at 100° C. Analysis calculated for $C_{22}H_{35}NO_4.HCl$: C, 63.82; H, 8.77. Found: C, 63.31; H, 8.46.

EXAMPLE IV m-Carbo-n-butoxyphenyl γ-morpholinopropyl ether n-Butyl-m-hydroxybenzoate is prepared by the reaction of m-hydroxybenzoic acid and n-butanol in toluene with sulfuric acid catalyst; it boils at 152–154° C. at 0.4 mm. This ester (24.4 g., 0.125 mole) is added to the alcoholate formed by reaction of potassium (5. g., 0.125 mole) with 100 cc. n-butanol; γ-morpholinopropyl chloride (20.5 g., 0.125 mole) is then added with stirring. The reaction mixture is stirred and refluxed for five hours. Evaporation on the steam-bath removes little of the solvent and the material is then partitioned between ether and water. The ethereal solution is dried and distilled; the m-carbo-n-butoxyphenyl γ-morpholinopropyl ether boils at 213–216° at 0.7–1.0 mm. Analysis calculated for $C_{18}H_{27}NO_4$: C, 67.11; H, 8.47; N, 4.36. Found: C, 67.08; H, 8.44; N, 4.40.

EXAMPLE V p-Carbomethoxyphenyl β-morpholinoethyl ether

Sodium 2.3 g. (0.101 mole), is added to 100 ml. methanol and, when the reaction is complete, 15.4 g. (0.101 mole) methyl p-hydroxybenzoate is added to the stirred solution. β-Morpholinoethyl chloride, 15.1 g. (0.101 mole) is then added and mixture is stirred and refluxed for 24 hours. The methanol is distilled and 100 ml. water added to the residue. The organic layer is separated and the aqueous layer extracted with chloroform. The organic layer combined with the chloroform extract is distilled and a light brown oil, p-carbomethoxyphenyl β-morpholinoethyl ether, B. P., 161–165° C./0.4–0.5 mm., $n_D^{25}/5405$, is collected. Calculated for $C_{14}H_{19}NO_4$: 63.38% C; 7.22% H; 5.34% N. Found: 63.10% C; 7.45% H; 5.37% N.

Conversion of the base to the hydrochloride gives a solid which is recrystallized from 2-propanol, M. P. 200–202° C. Calculated for $C_{14}H_{19}NO_4.HCl$: 55.72% C; 6.68% H. Found: 55.62% C; 6.67% H.

EXAMPLE VI p-Carbomethoxyphenyl β-piperidinoethyl ether HCl p-Carbomethoxyphenyl β-bromoethyl ether, 13 g. (0.05 mole), and piperidine, 42.5 g. (0.5 mole), are mixed and refluxed for about an hour. Most of the excess piperidine is distilled and the residue diluted with about 100 ml. water. The organic material is extracted twice with chloroform and the combined extract washed with water until the washings are neutral. The chloroform is distilled and the residue diluted with ether. The ethereal solution is dried and decolorized and then treated with ethereal HCl. The solid p-carbo methoxyphenyl β-piperidinoethyl ether HCl which separates is recrystallized from 2-propanol, M. P. 191–193° C. Calculated for $C_{15}H_{21}NO_3.HCl$: 60.09% C; 7.40% H. Found: 59.79% C; 7.26% H.

EXAMPLE VII o-Carbethoxyphenyl ε-pyrrolidinoamyl ether HCl o-Carbethoxyphenyl ε-bromoamyl ether, 31.5 g. (0.1 mole), and pyrrolidine, 71 g. (1 mole), are mixed and refluxed for two hours.

Most of the free pyrrolidine is distilled and the residue diluted with water. The organic layer is drawn off and combined with a chloroform extract of the aqueous phase. This solution is then washed with water until the washings are neutral and, after distillation of the chloroform, the residue is dissolved in ether. The solution is dried and decolorized before treating with ethereal HCl, which causes a solid to separate. This product, o-carbethoxyphenyl ε-pyrrolidinoamyl ether HCl, recrystallized by solution in 2-propanol and precipitation with dry ether, melts at 86–88° C. Calculated for $C_{18}H_{27}NO_3.HCl$: 63.24% C; 8.26% H. Found: 63.20% C; 8.26% H.

Similarly the piperidino-, morpholino-, and N-methylpiperazino- derivatives were prepared:

o-Carbethoxyphenyl ε-piperidinoamyl ether HCl, M. P. 108–110°. Calculated for $C_{19}H_{29}NO_3.HCl$: 64.12% C; 8.51% H. Found: 64.15% C; 8.30% H.

o-Carbethoxyphenyl ε-morpholinoamyl ether HCl, M. P. 113–114°. Calculated for $C_{18}H_{27}NO_4.HCl$: 60.41% C; 7.91% H. Found: 60.50% C; 7.74% H.

o-Carbethoxyphenyl ε-(4-methylpiperazino) amyl ether.2HCl, M. P. 213–215°. Calculated for $$C_{19}H_{30}N_2O_3.2HCl$$

56.01% C; 7.91% H. Found: 56.11% C; 8.03% H.

EXAMPLE VIII o-Carbomethoxyphenyl ζ-morpholinohexyl ether HCl o-Carbomethoxyphenyl ζ-bromohexyl ether, 22 g. (0.07 mole), and morpholine, 61 g. (0.7 mole), are mixed and refluxed for 2 hours. The excess morpholine is distilled and the residue diluted with water. The organic layer is drawn off and combined with a chloroform extract of the aqueous phase. The chloroform solution is washed with water until the washings are neutral and the chloroform is then distilled. The residue is dissolved in ether and the solution dried, decolorized, filtered and then treated with ethereal HCl. The resulting solid, o-carbomethoxyphenyl ζ-morpholinohexyl ether HCl, is recrystallized from 2-propanol using dry ether to precipitate, M. P. 99–102° C. Calculated for $C_{18}H_{27}NO_4.HCl$: 60.41% C; 7.89% H. Found: 60.16% C; 7.92% H.

The following γ-morpholinopropyl ethers are synthesized by the same general reactions as outlined in the preceding examples and the acid addition salts prepared in some instances.

o-Carbomethoxyphenyl, hydrochloride m. 188–190° C.
o-Carbethoxyphenyl, hydrochloride m. 152–154° C.
o-Carboisopropoxyphenyl, hydrochloride m. 134–136° C.
o-Carbo-n-butoxyphenyl, hydrochloride m. 74–76° C.
o-Carboisobutoxyphenyl, hydrochloride m. 103–105° C.
o-Carbo-n-amyloxyphenyl, b. 184–186° C./1 mm.

o-Carboisoamyloxyphenyl, hydrochloride m. 88–90° C.
o-Carbohexyloxyphenyl, b. 191° C./0./5 mm.
o-Carbo-n-heptyloxyphenyl, b. 177° C./0.15 mm.
o-Carbo-n-octyloxyphenyl, b. 217° C./0.9 mm.
o-Carbo-n-nonyloxyphenyl, b. 195–196° C./0.15 mm.
o-Carbo-n-decyloxyphenyl, b. 205° C./0.32 mm.
m-Carbomethoxyphenyl, b. 201° C./0.5 mm.
m-Carbethoxyphenyl, b. 202–205° C./1.1–1.5 mm.
m-Carbo-n-propoxyphenyl, b. 206–208° C./0.7–0.5 mm.
m-Carbo-n-butoxyphenyl, b. 216° C./1.0 mm.
m-Carbo-n-amyloxyphenyl, b. 224–226° C./1.0 mm.
p-Carbomethoxyphenyl, b. 191–194° C./0.5 mm.
p-Carbethoxyphenyl, hydrochloride m. 148–149° C.
p-Carbo-n-propoxyphenyl, hydrochloride m. 130–132° C.
p-Carbo-n-butoxyphenyl, hydrochloride m. 124–126° C.
p-Carbohexyloxyphenyl, hydrochloride m. 123–126° C.
p-Carbo-n-heptyloxyphenyl, hydrochloride m. 131–132° C.
p-Carbo-n-octyloxyphenyl, hydrochloride m. 127–129° C.

Others may practice this invention in any of the numerous ways which will be suggested to one skilled in the art upon a reading of this disclosure. All such practice of the invention is considered to be covered herewith provided it falls within the scope of the appended claims.

We claim:

1. A compound selected from the group consisting of basic ethers and the acid addition salts thereof, the basic ethers having the structural formula

wherein R is an alkyl group having 1 to 10 carbon atoms inclusive, Z is an alkylene group having from 2 to 6 carbon atoms inclusive, and NX is the morpholino group.

2. The acid addition salts of basic ethers having the structural formula

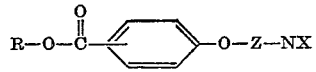

wherein R is an alkyl group having 1 to 10 carbon atoms inclusive, Z is an alkylene group having from 2 to 6 carbon atoms inclusive, and NX is the morpholino group.

3. The basic ethers having the structural formula

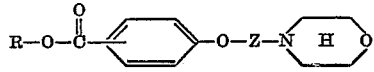

wherein R is an alkyl group having 1 to 10 carbon atoms inclusive, and Z is an alkylene group having from 2 to 6 carbon atoms inclusive.

4. The basic ethers having the structural formula

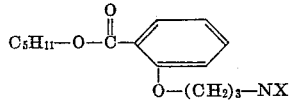

wherein NX is the morpholino group.

5. The basic ethers having the structural formula

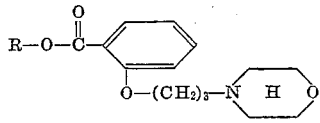

wherein R is an alkyl group having 1 to 10 carbon atoms inclusive.

6. The basic ethers having the structural formula

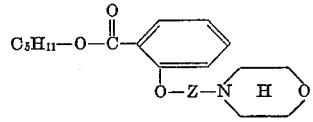

wherein Z is an alkylene group having from 2 to 6 carbon atoms inclusive.

7. o-Carbomethoxyphenyl γ-morpholinopropyl ether.
8. p-Carbo - n - octyloxyphenyl γ - morpholinopropyl ether.
9. m-Carbethoxyphenyl γ-morpholinopropyl ether.
10. o-Carbo - n - amyloxyphenyl γ-morpholinopropyl ether.
11. o-Carbo - n - decyloxyphenyl γ-morpholinopropyl ether.

References Cited in the file of this patent

UNITED STATES PATENTS

| 2,439,818 | McElvain | Apr. 20, 1948 |
| 2,448,996 | McElvain | Sept. 7, 1948 |
| 2,642,432 | Clinton | June 16, 1953 |
| 2,642,434 | Clinton | June 16, 1953 |

OTHER REFERENCES

Einhorn et al.: Annalen, vol. 382, pp. 237–265 (particularly pages 259 and 261–62 (1911).

Karrer: Org. Chem., 2nd ed., page 109 (1946).